United States Patent
Sanyal (10) Patent No.: US 8,704,703 B2
(45) Date of Patent: Apr. 22, 2014

(54) PSEUDOSYNCHRONIZER FOR AN UNSYNCHRONIZED BISTATIC RADAR SYSTEM

(75) Inventor: Probal Kumar Sanyal, Syracuse, NY (US)

(73) Assignee: The MITRE Corporation, McLean, VA (US)

( * ) Notice: Subject to any disclaimer, the term of this patent is extended or adjusted under 35 U.S.C. 154(b) by 202 days.

(21) Appl. No.: 13/211,059

(22) Filed: Aug. 16, 2011

(65) Prior Publication Data

US 2013/0044023 A1     Feb. 21, 2013

(51) Int. Cl.
*G01S 13/08* (2006.01)

(52) U.S. Cl.
USPC ............. 342/125; 342/59; 342/128; 342/132; 342/134

(58) Field of Classification Search
CPC ..................................................... G01S 13/36
USPC ............... 342/25 R–25 F, 118, 127, 194, 196
See application file for complete search history.

(56) References Cited

U.S. PATENT DOCUMENTS

| | | | | |
|---|---|---|---|---|
| 5,179,383 A * | 1/1993 | Raney et al. | ................ | 342/25 D |
| 5,760,732 A * | 6/1998 | Marmarelis et al. | .......... | 342/145 |
| 6,018,311 A * | 1/2000 | David | ........................... | 342/196 |
| 6,492,932 B1 * | 12/2002 | Jin et al. | ................... | 342/25 R |
| 6,622,118 B1 * | 9/2003 | Crooks et al. | ................. | 702/190 |
| 6,747,593 B1 | 6/2004 | Jaffer | | |
| 6,850,186 B2 * | 2/2005 | Hellsten | ......................... | 342/93 |
| 7,148,839 B2 * | 12/2006 | Chen | .............................. | 342/125 |
| 7,333,046 B2 | 2/2008 | Perry et al. | | |
| 7,663,530 B2 | 2/2010 | Perry et al. | | |
| 2005/0073455 A1 | 4/2005 | Chow et al. | | |
| 2010/0259442 A1 * | 10/2010 | Abatzoglou et al. | ........ | 342/25 A |

OTHER PUBLICATIONS

Perry, R.P.; DiPietro, R.C.; Fante, R., "SAR imaging of moving targets," Aerospace and Electronic Systems, IEEE Transactions on, vol. 35, No. 1, pp. 188,200, Jan. 1999.*
Krieger, Gerhard and Marwan Younis, *Impact of Oscillator Noise in Bistatic and Multistatic SAR*, IEEE Geoscience and Remote Sensing Letters, vol. 3, No. 3, Jul. 2006, pp. 424-428.
Krieger, Gerhard, et al., *Impact of Oscillator Noise in Bistatic and Multistatic SAR*, Microwaves and Radar Institute, 4 pgs., Jul. 2005.
Krishnan, V., et al., *Multistatic Synthetic Aperture Radar Image Formation*, IEEE Transactions of Image Processing, vol. 19, No. 5, May 2010, pp. 1290-1306.
Lopez-Dekker, Paco, et al., *Phase Synchronization and Doppler Centroid Estimation in Fixed Receiver Bistatic SAR Systems*, IEEE Transactions on Geoscience and Remote Sensing, vol. 46, No. 11, Nov. 2008., pp. 3459-3471.
Perry, R.P., et al., *SAR Imaging of Moving Targets*, IEEE Transactions of Aerospace and Electronic Systems, vol. 35, No. 1, Jan. 1999, pp. 188-200.
Walterscheid, Ingo, et al., *Bistatic SAR Processing and Experiments*, IEEE Transactions on Geoscience and Remote Sensing, vol. 44, No. 10, Oct. 2006, pp. 2710-2717.

* cited by examiner

*Primary Examiner* — John B Sotomayor
*Assistant Examiner* — Marcus Windrich (57) ABSTRACT

Methods and systems for post processing synchronization of bistatic radar data are disclosed. A transmitter is configured to transmit pulses at a first rate controlled by a first local oscillator. A receiver is configured to receive pulses at a second rate controlled by a second oscillator. A processing device is configured to synchronize, with respect to the first rate, in-phase quadrature data received from the receiver using a keystone formatting technique.

8 Claims, 13 Drawing Sheets

PSEUDOSYNCHRONIZER FOR AN UNSYNCHRONIZED BISTATIC RADAR SYSTEM

BACKGROUND

1. Field of the Invention

Embodiments relate to monitoring targets in a bistatic radar systems.

2. Background

Radar systems, including synthetic aperture radar (SAR) systems, may be monostatic or bistatic. A monostatic radar system refers to a radar system in which the transmitter and receiver are collocated, or located at the same location. A bistatic radar system refers to a radar system in which the transmitter and receiver are located at different locations. The transmitter and receiver may be separated by a great distance. Bistatic radar systems may provide additional information based on the bistatic reflectivity of targets, may be more flexible than monostatic systems, and be less vulnerable to outside damaging forces.

However, certain bistatic radar systems may suffer from a problem known as gate walk or range walk. Gate walk or range walk refers to the problem that in a bistatic radar system, the transmitter and receiver may not be exactly synchronized. Thus, returning signals from transmitted pulses that reflected off an object may impart a phantom velocity to the object.

One solution to remove range walk is to detect a peak in compressed pulses in a coherent processing interval. However, the peak may have to be determined by a machine or human. If no peak is determined, this solution may be difficult to implement.

Another solution is to estimate a velocity correction in an iterative process. However, this may only correct the velocity of one object under observation. Multiple velocity correction processes may be necessary to correct the velocity for multiple objects.

SUMMARY

Thus, what is needed are improved methods and systems for removing range walk in bistatic radar systems.

According to one embodiment, a system removes range walk in a bistatic radar system using a transmitter, a receiver, and a processing device. The transmitter is configured to transmit pulses at a first rate controlled by a first local oscillator. The receiver is configured to receive transmitted pulses at a second rate controlled by a second local oscillator. The system includes a processing device configured to synchronize, with respect to the first rate, in-phase quadrature data (IQ data) from the receiver using keystone formatting.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Before describing such embodiments in more detail, however, it is instructive to present an example environment in which embodiments of the present invention may be implemented.

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Figure 1:
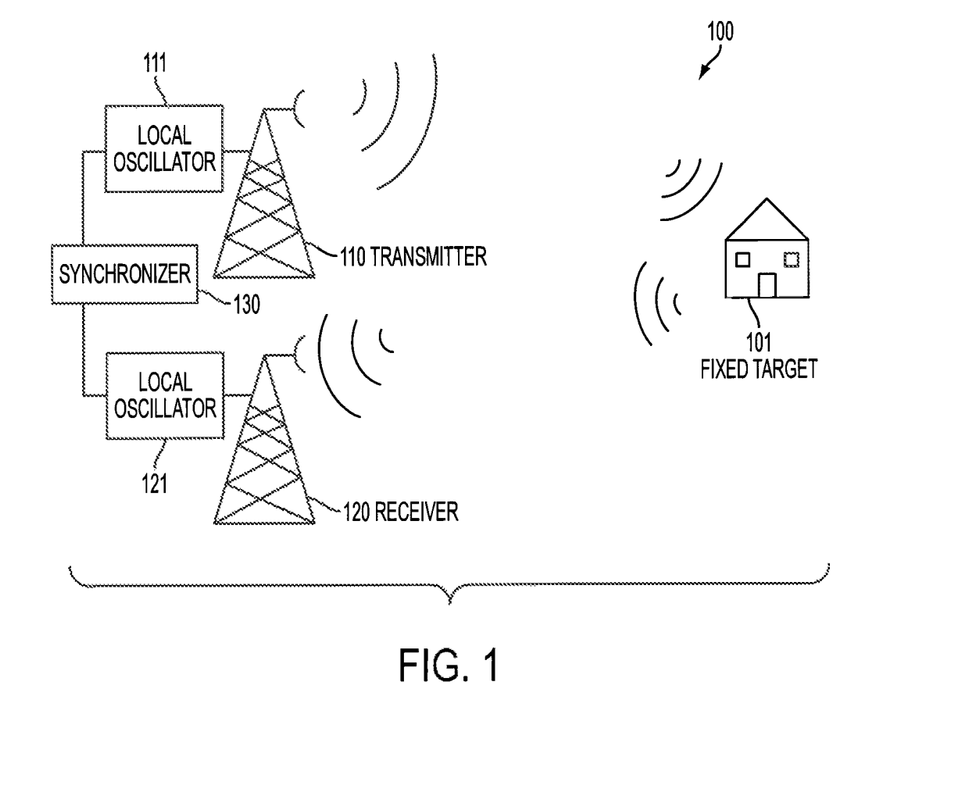
FIG. 1 is a diagram of a bistatic radar system environment.

FIG. 1 is a diagram of a bistatic radar system environment, such as bistatic SAR system environment 100, which includes a transmitter 110, receiver 120, and fixed target 101.

Transmitter 110 transmits pulses at a certain bandwidth. Transmitter 110 transmits these pulses at a rate controlled by local oscillator (LO) 111. For example, local oscillator 111 may control the timing a window opens for pulses transmitted by transmitter 110 to pass through. Transmitted pulses may reflect from fixed target 101.

Receiver 120 receives pulses at the bandwidth transmitted by transmitter 110 that are reflected from fixed target 101. To receive pulses, receiver 120 opens its receive gate after a period of time has passed from the pulse being transmitted by transmitter 110. The receive gate of receiver 120 may be opened at a rate controlled by local oscillator 121 associated with receiver 120.

Although local oscillator 121 and local oscillator 111 are separate, their clocks may be synchronized or locked together via synchronizer 130. Synchronizer 130 may lock the timing of local oscillator 111 and 121 via timing signals sent over a connecting cable, or signals sent wirelessly. Thus, receiver 120 may open its receive gate at a fixed time after transmitter 110 transmits a pulse.

Figure 2:
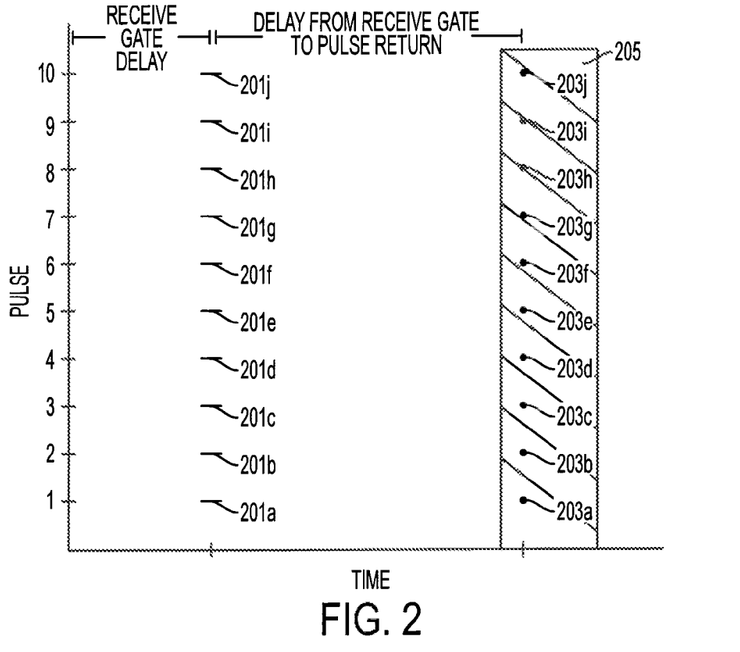
FIG. 2 is a timeline of return signals of a bistatic radar system.

FIG. 2 is a timeline of return signals of a bistatic radar system. For example, FIG. 2 is an example timeline of return signals from a radar signal bouncing off of a fixed target, such as fixed target 101 of FIG. 1. The vertical axis of the timeline represents a numerical value of the pulse transmitted by transmitter 110 (see FIG. 1), i.e., the first, second, third, etc. The horizontal axis may reflect a period of time, which can be used to determine a range cell for each pulse or for a collection of pulses. Each horizontal line 201a-201j represents an opening of the receive gate of receiver 120 (see FIG. 1) at a fixed time after the pulse is transmitted by transmitter 110. Each dot 203a-203j represents a signal return from a fixed target, such as fixed target 101.

As seen in FIG. 2, each receive gate opening occurs at a fixed time after the pulse is transmitted by transmitter 120. Further, each return signal returning from the fixed target is received after a fixed delay from the receive gate opening. Thus, each return signal from the fixed target may appear in the same range cell, as indicated by shaded rectangle 205.

Figure 3:
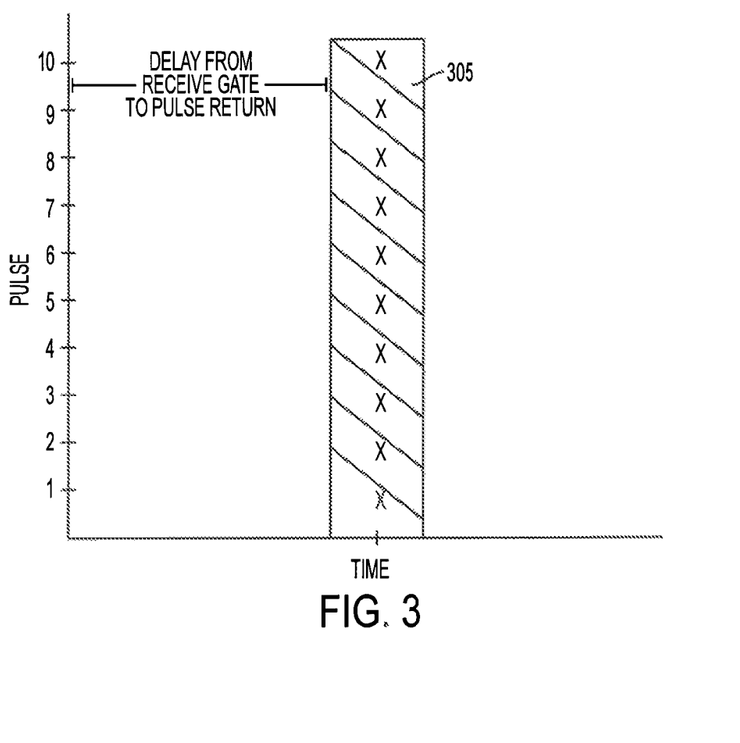
FIG. 3 is a further timeline of return signals of a bistatic radar system.

FIG. 3 is a further timeline of return signals of a bistatic radar system. FIG. 3 shows arrival times of return signals from a fixed target (not shown), with respect to a beginning of a receive window as indicated by an opening of the receive gate. Return signals from the fixed target appear in the same range cell, indicated by shaded rectangle 305.

In one example, coherent processing applied to the return signals may indicate a range for the target. For example, Doppler processing using a fast Fourier transform may be used to perform coherent processing. Coherent processing may also determine whether a moving target is present in the area under observation by the radar system.

Figure 4:
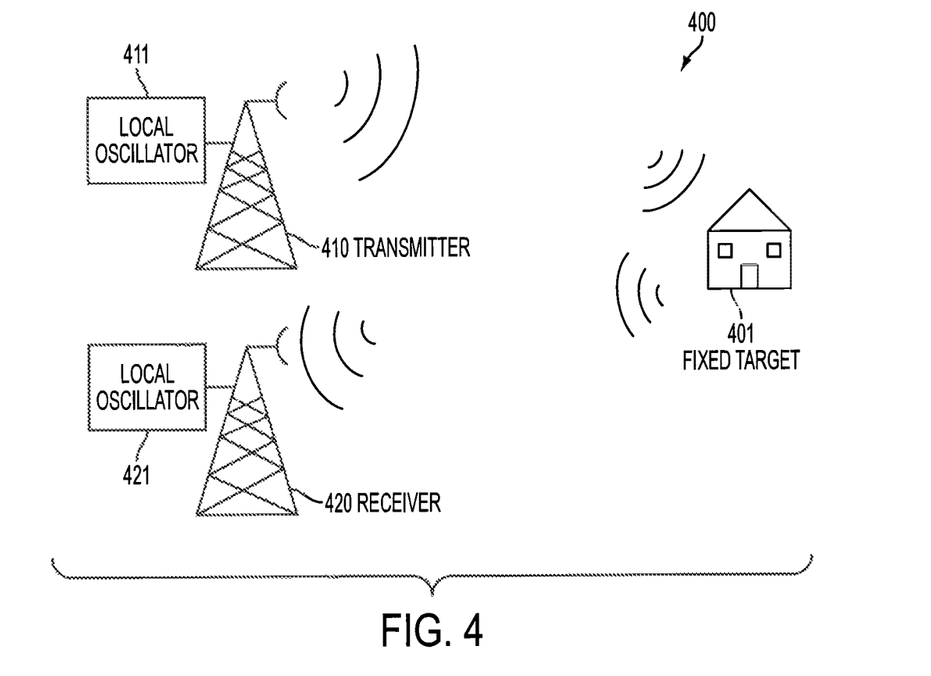
FIG. 4 is diagram of an unsynchronized bistatic radar system environment.

FIG. 4 is a diagram of an unsynchronized bistatic radar system environment. FIG. 4 shows a bistatic radar system environment 400 in which embodiments may be implemented. In one example, environment 400 includes transmitter 410, a receiver 420, and a processing device 430. Transmitter 410 transmits pulses at a rate controlled by local oscillator 411. Receiver 420 receives pulses at a rate controlled by local oscillator 421. In one example, the pulses received by receiver 420 may be based on transmitted pulses that have reflected from fixed target 401, i.e., return signals.

The frequency at which local oscillator 411 instructs transmitter 410 to transmit pulses, and the frequency at which local oscillator 421 instructs receiver 420 to receive pulses may be configured to be the same frequencies. However, the local oscillators 411 and 421 may not be synchronized on an ongoing basis or at a specific time interval. Due to various factors, the local oscillators may have a small discrepancy between their actual operating frequencies.

Figure 5:
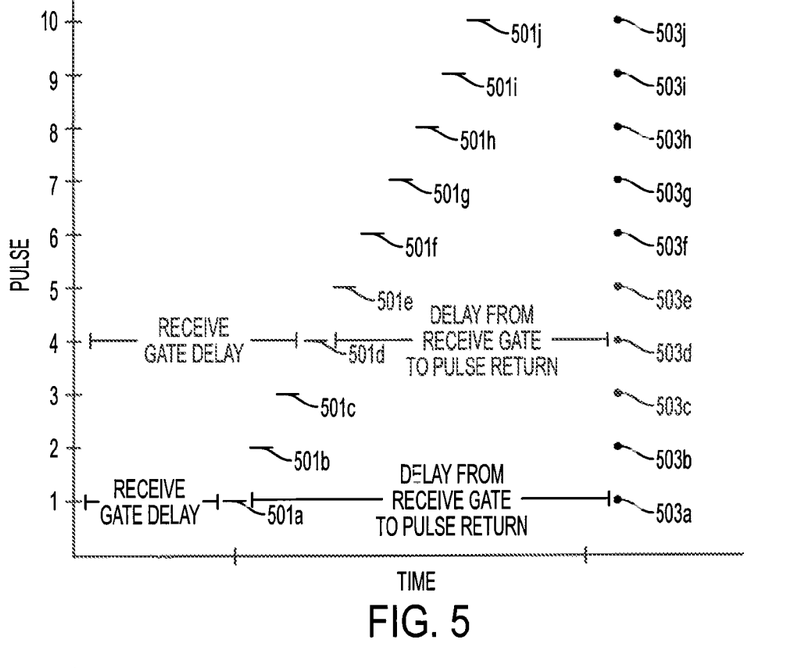
FIG. 5 is a timeline of return signals of an unsynchronized bistatic radar system.

FIG. 5 shows an example timeline of return signals from an unsynchronized radar system, e.g., radar system of environment 400. In one example, elements from system 400 will be discussed with respect to FIG. 5. Transmitted signals may reflect from a fixed target, such as fixed target 401. Vertical lines 501a-501m indicate the time the receive gate of the receiver opens with respect to the time each pulse is transmitted by transmitter 410. The return signal reflected from the fixed target may be at a constant time after the transmission of the pulse, as indicated by the dots 503a-503j. However, as seen in FIG. 5, the time the reflected pulse is received with respect to the time the receive gate opens may change at each subsequent pulse. For example, as measured with respect to the time each pulse is transmitted, the receive gate opening corresponding to line 501d occurs after the receive gate opening corresponding to line 501a. Thus, the time between the return from the reflected pulse and the opening of the receive gate may change for every pulse. This difference may be due to the fact that the local oscillators are not synchronized.

Accordingly, in contrast to the timeline of FIG. 2, the return signals of FIG. 5 would each appear in different range cells. This can be seen more clearly in FIG. 6.

Figure 6:
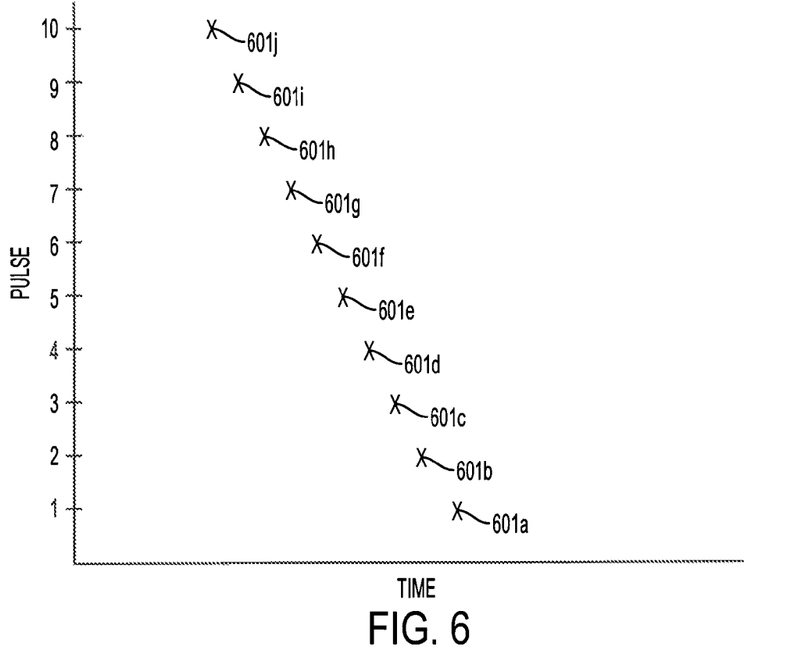
FIG. 6 is a further timeline of return signals of an unsynchronized bistatic radar system.

FIG. 6 is a further timeline of return signals of an unsynchronized bistatic radar system. Each symbol 601a-601j of FIG. 6 denotes the arrival time of the return signals from the fixed target (not shown) measured with respect to the beginning of the receive window, as indicated by the opening of the receive gate. For each pulse, the return from the fixed target arrives closer with respect to the opening of the receive gate. This may be because the receiver local oscillator is not synchronized with the transmitter local oscillator.

Thus, even though the transmitter, receiver, and target object are all stationary, the arrival times of the return signals from the fixed object, when measured against the opening of the receive gate, can change steadily. This can be referred to as "gate walk." The "gate walk" can be caused by the lack of synchronization of transmitter and receiver local oscillators and can translate into a "range walk" for the fixed target object in a static radar scenario. Thus, the fixed object appears to move. For example, given a 10 MHz local oscillator for both the transmitter and a receiver, a frequency discrepancy of 1 Hz may cause a range drift of the pulse response of 15 meters per second. Further, if a radar signal has, for example, a range resolution of 1 meter, return signals from a fixed object may drift through 15 range cells over a period of one second. Thus, range walk and gate walk may contribute to inaccuracies in range measurement in a bistatic radar system.

Figure 7A:
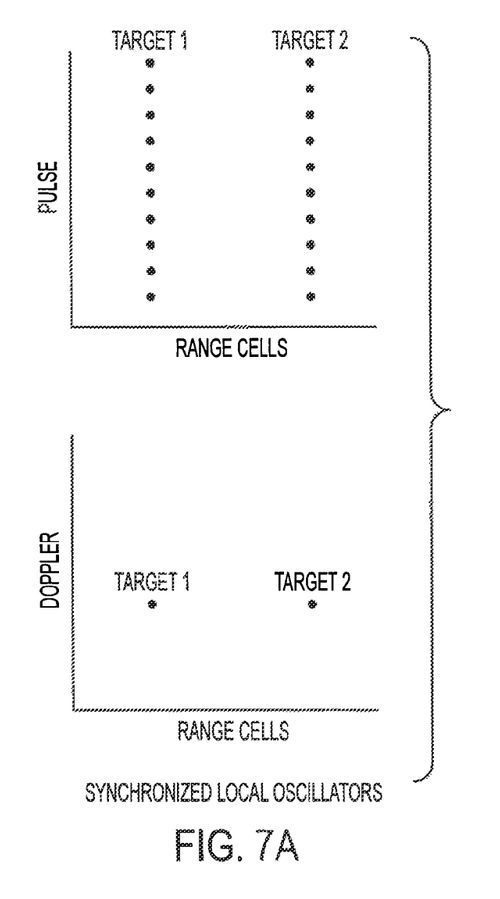
FIGS. 7A and 7B are exemplary depictions of coherent processing applied to a synchronized bistatic radar system and an unsynchronized bistatic radar system.
Figure 7B:
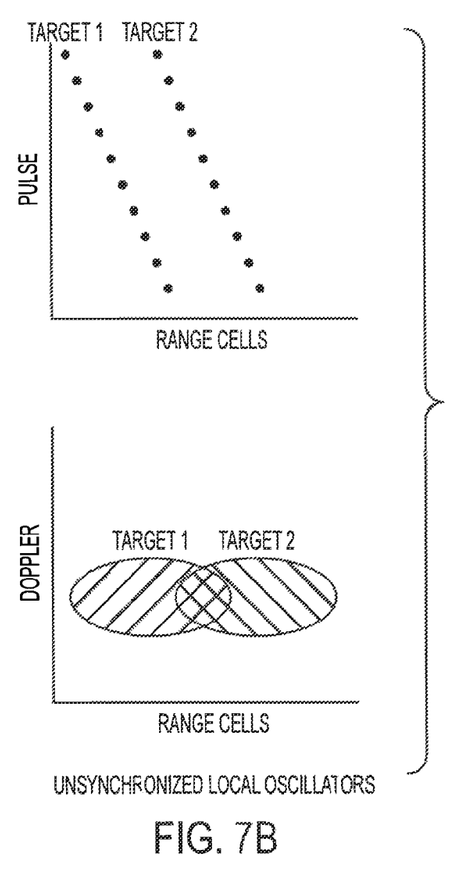

FIGS. 7A and 7B are exemplary depictions of coherent processing applied to a synchronized bistatic radar system and an unsynchronized bistatic radar system. For example, FIGS. 7A and 7B compare the results of coherent processing of multiple return signals in a system where local oscillators are synchronized (FIG. 7A) and in a system where local oscillators are not synchronized (FIG. 7B). In each system, two targets are under observation. As seen in FIG. 7A, each set of return signals from a fixed object appear in one range cell, and coherent processing results in sharp images. Further, coherent processing on a synchronized system may result in an accurate, focused range for the target.

As seen in FIG. 7B, return signals from each fixed object appear in different range cells. Coherent processing on the unsynchronized system may result in smeared or unfocused images, and the distances or ranges of the object may be hard to discern. Further, coherent processing applied to the return signals of the unsynchronized system may result in overlapping ranges for each target object under observation.

Processing the received pulses to compensate for range walk and the unsynchronized transmitter and receiver may eliminate gate walk and range walk to produce coherent data and accurately determine the distance of the fixed target.

Figure 8:
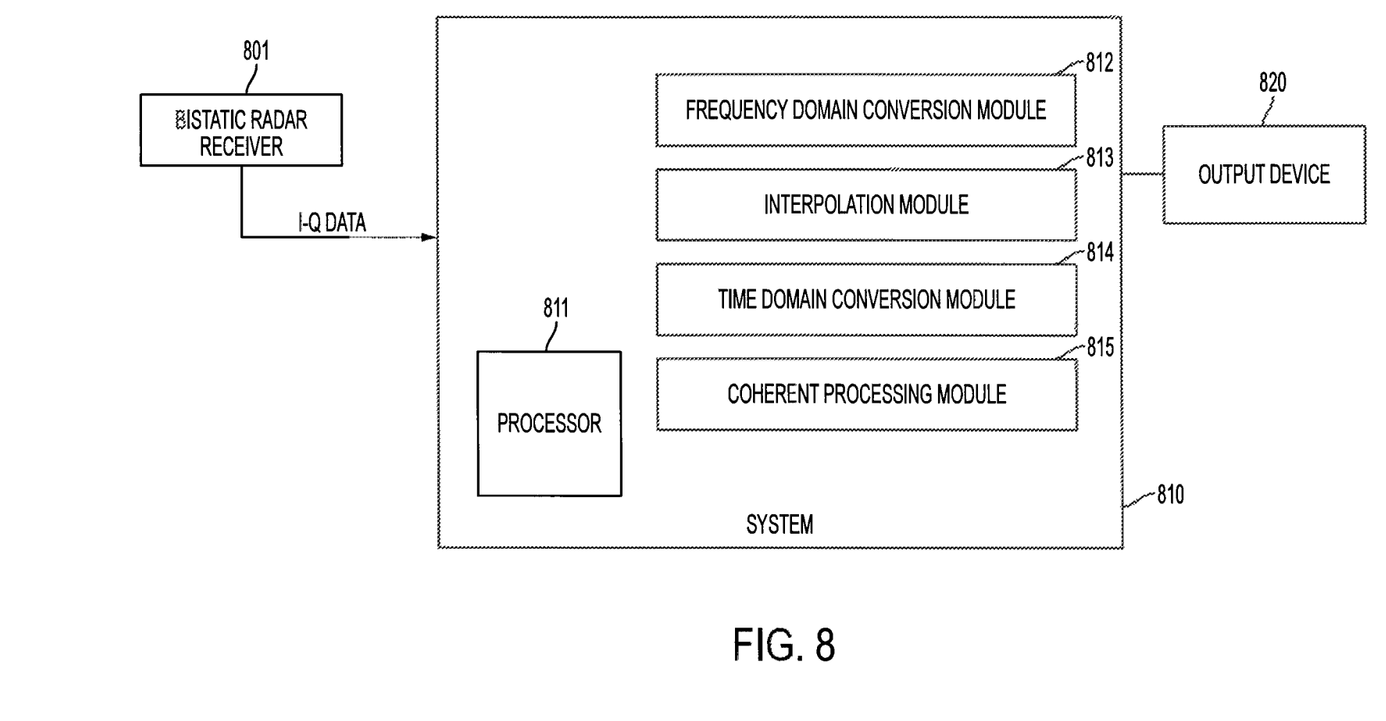
FIG. 8 is a diagram of a system in accordance with an embodiment.

FIG. 8 is a diagram of a system in accordance with an embodiment. In the example shown, pseudosynchronizer system 810 of FIG. 8 is a functional block diagram of a processing device configured to eliminate range walk in a bistatic radar system, such as the bistatic radar system of FIG. 4, in accordance with an embodiment. System 810 includes a processor 811, a frequency domain conversion module 812, an interpolation module 813, a time domain conversion module 814, and a coherent processing module 815. System 810 is coupled between a bistatic radar receiver 801 and an output device 820.

Processor 811 may be a general purpose or special purpose processor.

System 810 receives unsynchronized or unfocused inphase-quadrature data (I-Q data) from receiver 801 in a bistatic radar system. The I-Q data may be measured in the time domain.

Frequency domain conversion module 812, implemented on processor 811, is configured to convert the received I-Q data to the frequency domain. For example, module 812 may be configured to convert I-Q data from the time domain to the frequency domain using a Fourier transform by sampling the received data.

Interpolation module 813 is configured to interpolate the converted data output by module 812 in the frequency domain. In some embodiments, interpolation module 813 applies a keystone formatting technique, as will be described further herein, to interpolate the converted data and remove the gate walk and range walk.

Time domain conversion module 814 configured to convert the interpolated data provided by interpolation module 813 back to the time domain. For example, time domain conversion module 814 may use an inverse Fourier transform to convert frequency domain data to the time domain. The converted data may be synchronized such that gate walk and range walk are removed. That is, the converted data may correct the gate walk such that the data appears as if the receiver local oscillator were synchronized with the transmitter local oscillator.

System 810 may further generate a pseudosynchronized data plot from the converted data and output the data plot, for example and without limitation, to output device 820, e.g. a display, for visual output.

In one embodiment, the pseudosynchronized data plot may be transmitted to additional modules implemented on processor 811 for further processing. For example, a coherent processing module 815 may be implemented on processor 811 to perform Doppler processing.

Figure 9:
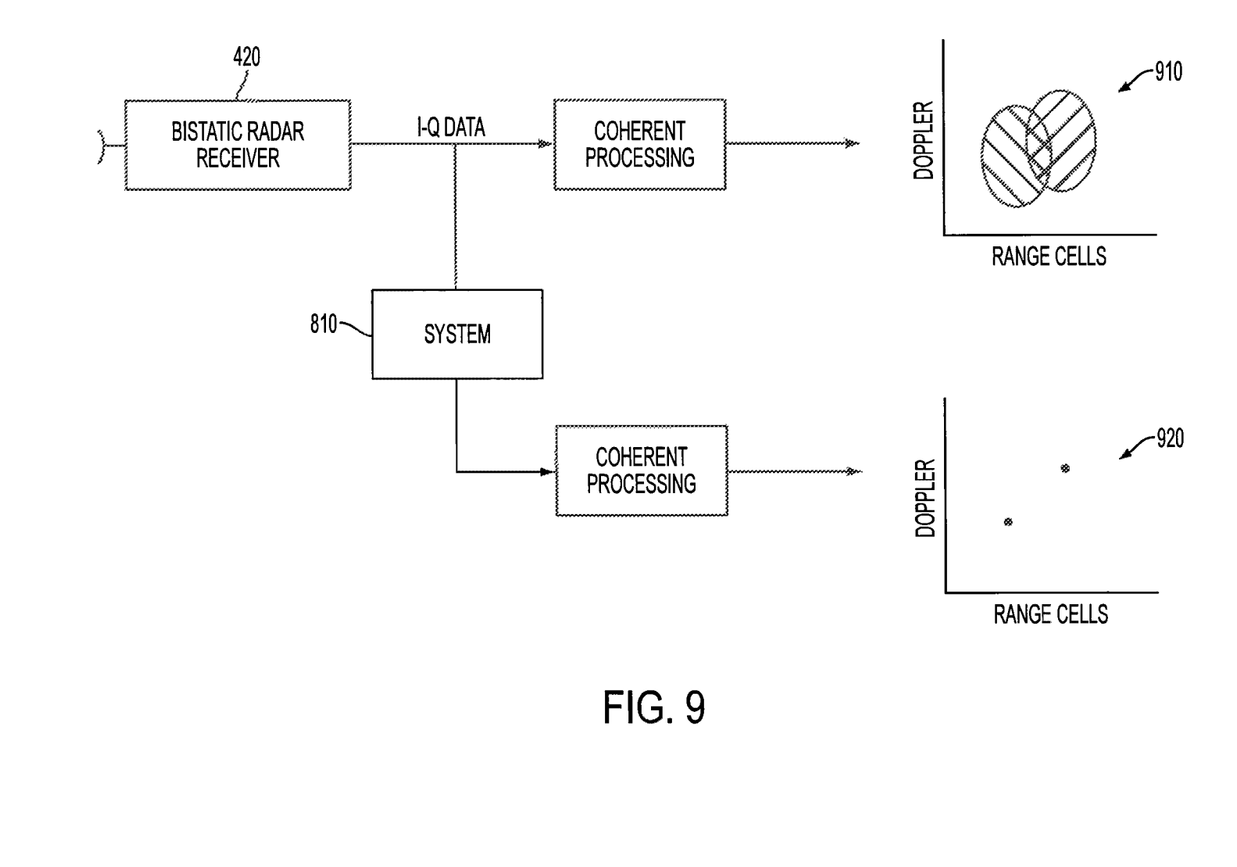
FIG. 9 is a comparison of synchronized and unsynchronized data in accordance with an embodiment.

FIG. 9 is a comparison of synchronized and unsynchronized data in accordance with an embodiment. For example, FIG. 9 shows example diagrams or charts 910 and 920 comparing how coherent processing affects unsynchronized data received from the bistatic radar receiver and how coherent processing affects data received from the bistatic radar receiver that has been synchronized by system 810 in FIG. 8, in accordance with embodiments.

As seen in chart 910, coherent processing applied to unsynchronized I-Q data obtained from a bistatic radar receiver, such as bistatic radar receiver 410 in FIG. 4, results in an unfocused image, where the range cells for the targets are not discernible.

In contrast, as seen in chart 920, coherent processing applied to I-Q data that has been synchronized, for example, by system 810 in FIG. 8, results in a sharp, focused image where the range cells for the targets are easily discernible.

The above embodiments have been described with reference to a stationary transmitter, receiver, and target object. However, embodiments may be equally applicable to a moving target object. Further, embodiments may be applicable to a moving transmitter and/or receiver.

Figure 10:
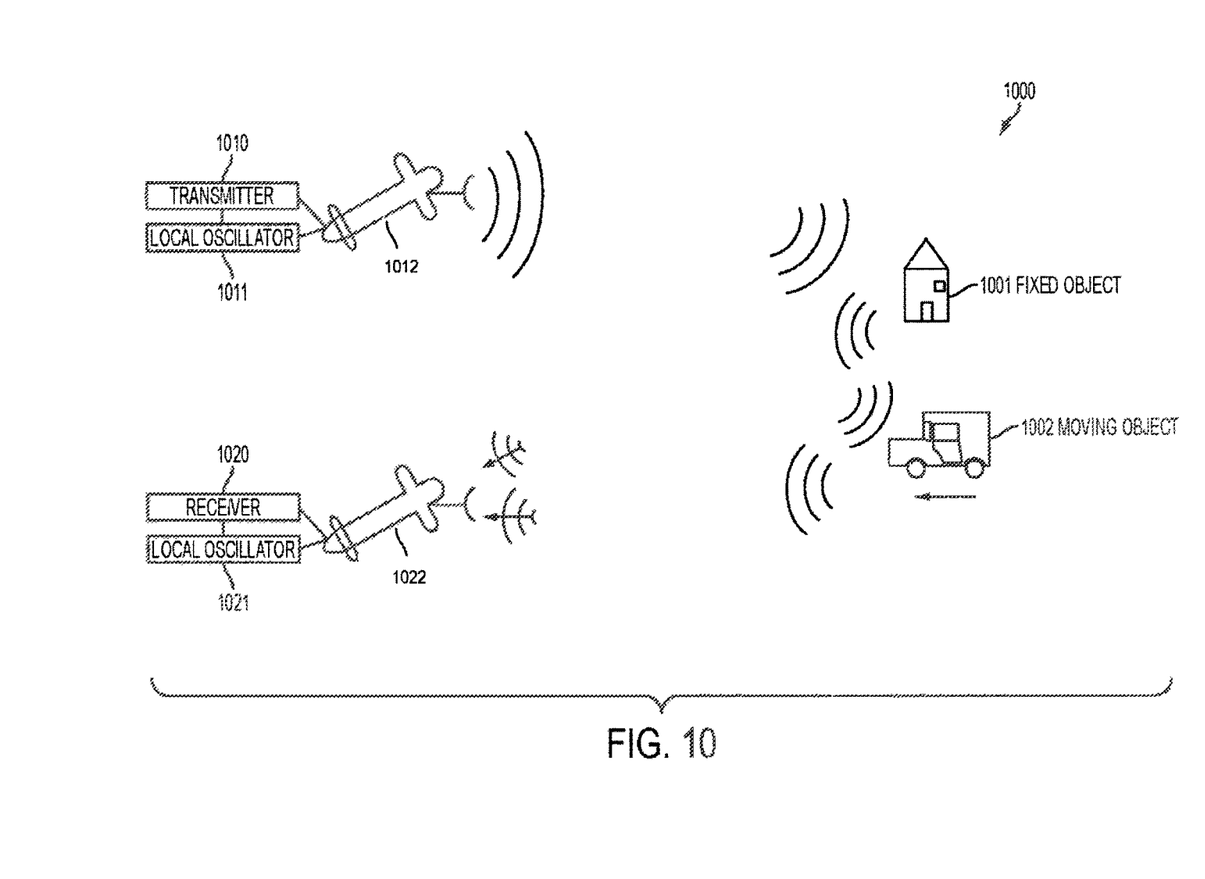
FIG. 10 is a diagram of a further unsynchronized bistatic radar system environment.

FIG. 10 is a diagram of a further unsynchronized bistatic radar environment 1000. In the example shown, environment 1000 includes fixed object 1001, a moving object 1002, a transmitter 1010 coupled to an oscillator 1011, and a receiver 1020 coupled to an oscillator 1021.

Fixed object 1001 can be a building, and moving object 1002 can be a vehicle.

In one example, transmitter 1010 can be on a moving platform 1012, such as an airplane or satellite. Transmitter 1010 includes local oscillator 1011 that controls the rate at which transmitter 1010 transmits radar pulses, which may then be reflected off of fixed object 1001 and moving object 1002.

In one example, return pulses, e.g., pulses reflected, scattered, etc. after transmitted pulses interact with fixed object 1001 or moving object 1002, may be received by receiver 1020, which may also be on a moving platform 1022, such as a second airplane or satellite. Receiver 1020 includes local oscillator 1021 which controls the rate at which receiver 1020 receives reflected radar pulses.

Figure 11:
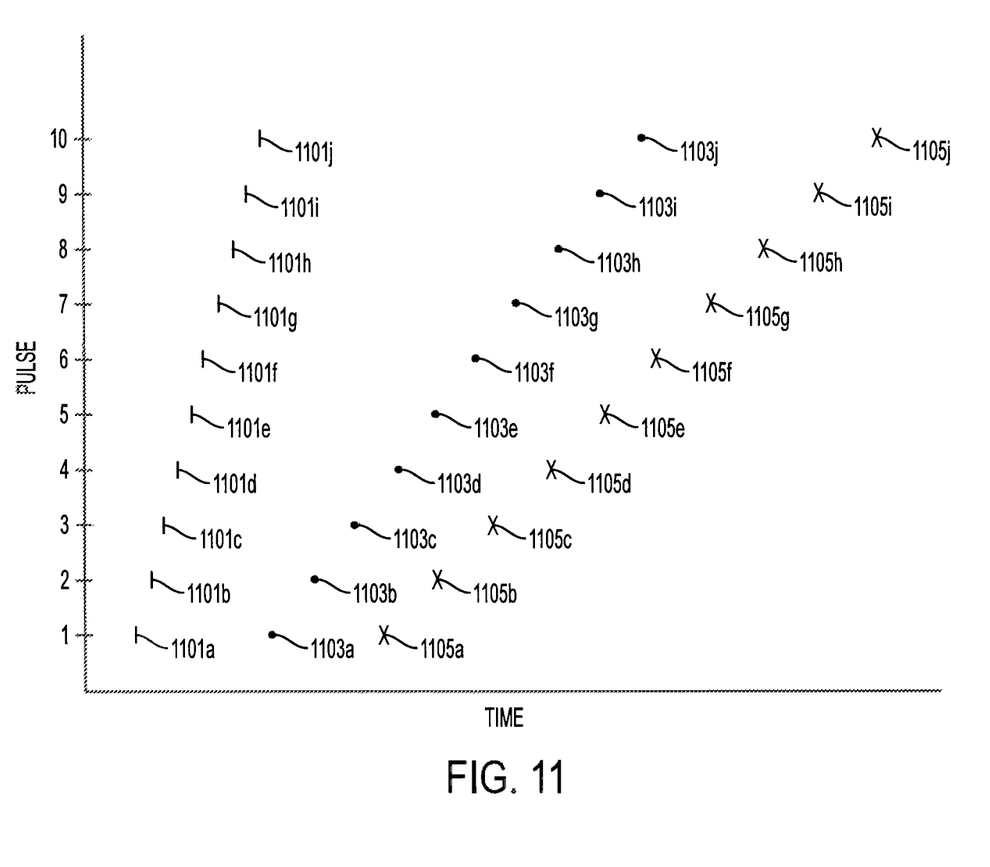
FIG. 11 is a further timeline of return signals of an unsynchronized bistatic radar system.

FIG. 11 is a further timeline of return signals of an unsynchronized bistatic radar system. For example, with reference to the elements of FIG. 10, FIG. 11 is a chart plotting the opening of the receive gate of receiver 1020, the return from the fixed object 1001, and the return from the moving object 1002, all measured with respect to the pulse transmitted by transmitter 1010. The opening of the receive gate is noted by the vertical lines 1101a-1101j. As with other bistatic radar systems, the timing of the opening of the receive gate changes with respect to the transmitted pulse if local oscillators 1011 and 1021 may not be synchronized.

Further, in FIG. 11, the return signals from the fixed object 1001 appear to drift as well, as noted by the dots 1103a-1103j because the distances between the transmitter 1010 and the fixed object 1001 and the fixed object 1001 and the receiver 1020 are constantly changing, as the transmitter 1010 and receiver 1020 are both moving. The return signals from the moving object 1001 also appear to drift, as noted by elements 1105a-1105j, as the distance measured is changing both due to the movement of the receiver 1020 and the movement of the object 1001/1002 itself.

Figure 12A:
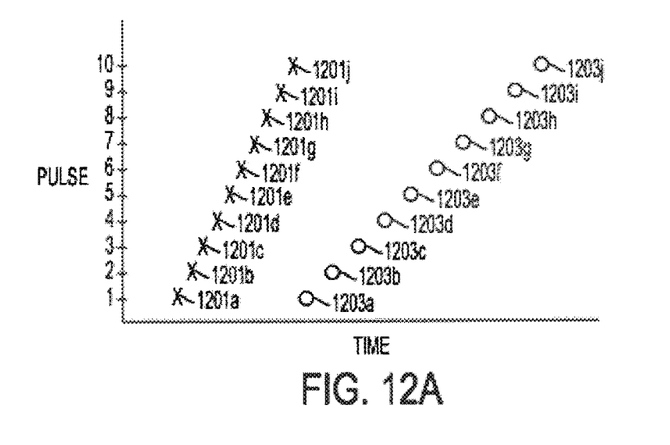
FIGS. 12A and 12B are exemplary depictions of coherent processing applied to a synchronized bistatic radar system and an unsynchronized bistatic radar system.
Figure 12B:
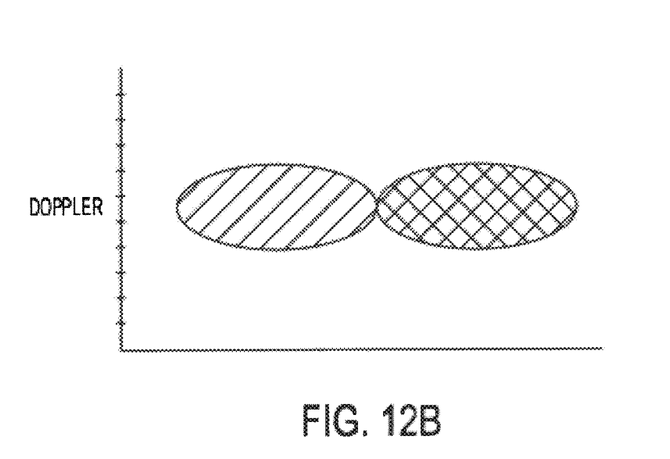

FIGS. 12A and 12B are exemplary depictions of coherent processing applied to a synchronized bistatic radar system and an unsynchronized bistatic radar system.

FIG. 12A shows the arrival times of the return signals of the fixed object and the moving object, with respect to the opening of the receive gate. As seen by elements 1201a-1201j and elements 1203a-1203j, the slopes of the arrival times are different, as one object is moving, while the other is stationary. Further, due to range walk, the objects would appear in different range cells over the number of pulses received.

FIG. 12B shows the result of coherent processing applied to the unsynchronized I-Q data. As seen in FIG. 12B, the returned images are fuzzy and unfocused and do not clearly indicate a range for either object.

Figure 13:
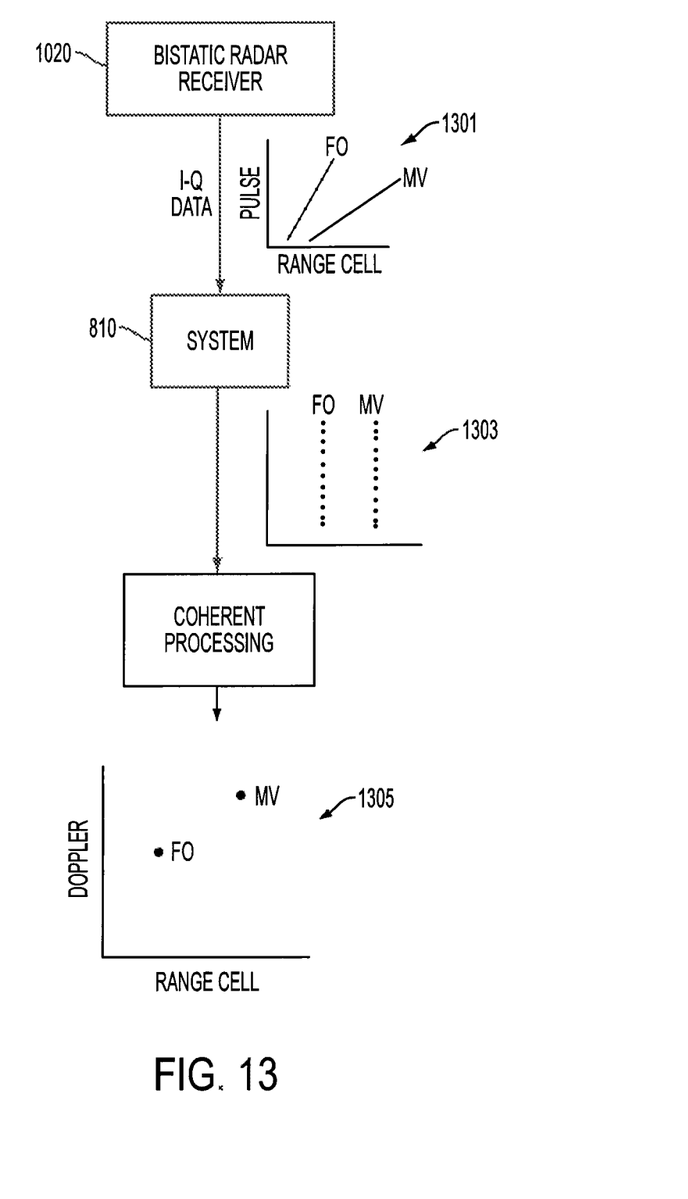
FIG. 13 is a diagram of synchronized data in accordance with an embodiment.

FIG. 13 is a diagram of synchronized data in accordance with an embodiment. For example, FIG. 13 shows an example diagram detailing how system 810 from FIG. 8 may be used to determine a range for objects from unsynchronized data in a bistatic radar system, in accordance with an embodiment. A bistatic radar receiver, such as bistatic radar receiver 1020, may provide I-Q data exhibiting range walk for a fixed object (FO) and a moving object (MV), such as the data shown in chart 1301. Upon removing the range walk by system 810, as described herein, the data may be synchronized to result in the I-Q data shown in chart 1303. Coherent processing may then be applied to determine a range cell for each object, as seen in chart 1305.

In one embodiment, a keystone formatting technique is applied to compensate for gate and range walk that occurs as a result of unsynchronized local oscillators. The keystone formatting technique may effectively synchronize the transmitter and receiver in post processing. Thus, range walk compensation is performed to compensate for unsynchronized local oscillators which result in blurred, unfocused, or streaked images, as seen in the above Figures.

In one example, range walk compensation can be accomplished within processor 810 of FIG. 8 using Keystone formatting techniques developed by MITRE of McLean, Va. For an exemplary description of the Keystone technique, see Perry et al. "SAR Imaging of Moving Targets," *IEEE TRANSACTIONS ON AEROSPACE AND ELECTRONIC SYSTEMS*, Vol. 35, No. 1, 1999, pages 188-200, which is incorporated by reference herein in its entirety. Keystone formatting can allow for compensation for several targets, both stationary and moving. Keystone formatting can be derived by noting that the spectrum of a single received pulse is given by, $$S_r(f) = P(f)\exp\left[-i\frac{4\pi}{c}(f+f_0)R(t)\right] \quad (1)$$

where
P(f)=spectrum of transmitted pulse
f=baseband frequency B where $$\left(\frac{-B}{2} \le f < \frac{B}{2}\right),$$

$f_0$=carrier frequency.
$S_r(f)$ is the keystone technique function,
i is an imaginary component,
R is range between radar and target at time t,
c is a speed of positive light,
$\dot{R}$ is the first derivative of the range with respect to time and
t' is a value of time.
Expanding R(t) in a Taylor series, results in:

$$R(t)=R(t_0)+\dot{R}(t_0)t+\tfrac{1}{2}\ddot{R}(t_0)t^2+\ldots. \quad (2)$$

Substituting (2) into (1) and dropping cubic and higher order terms, $$S_r(f) = P(f)\exp\left[-i\frac{4\pi}{c}(f+f_0)R - i\frac{4\pi}{c}(f+f_0)\dot{R}t - i\frac{2\pi}{c}(f+f_0)\ddot{R}t^2\right]. \quad (3)$$

The second term in the brackets containing the product f$\dot{R}$t gives rise to range walk. This term becomes zero when the temporal transformation is used:

$$t = \left(\frac{f_0}{f+f_0}\right)t'.$$

With the above substitution, (3) can be written as, $$S_r(f) = \quad (4)$$

$$P(f)\exp\left[-i\frac{4\pi}{c}(f+f_0)R - i\frac{4\pi}{c}f_0\dot{R}t' - i\frac{2\pi}{c}(f+f_0)\ddot{R}\left(\frac{f_0 t'}{f+f_0}\right)^2\right].$$

Since the Keystone formatting does not solve the quadratic (or higher order) motion problem, the quadratic term in (4) is dropped, and simplified as:

$$S_r(f) = P(f)*\exp\left[-i\frac{4\pi}{c}(f+f_0)R - i\frac{4\pi}{c}f_0\dot{R}t'\right]. \quad (5)$$

Notice that the substitution of t' for t has removed the phase term that varied with both time and frequency, and this removes the gate walk and range walk. Thus, no matter what the difference in frequencies of transmitter and receiver, each received pulse will remain in a given range determined by its position at the center (t=0) of the coherent processing interval. Thus, in one embodiment, the keystone technique may correct for gate walk and range walk in a one-step, non-iterative process.

Figure 14:
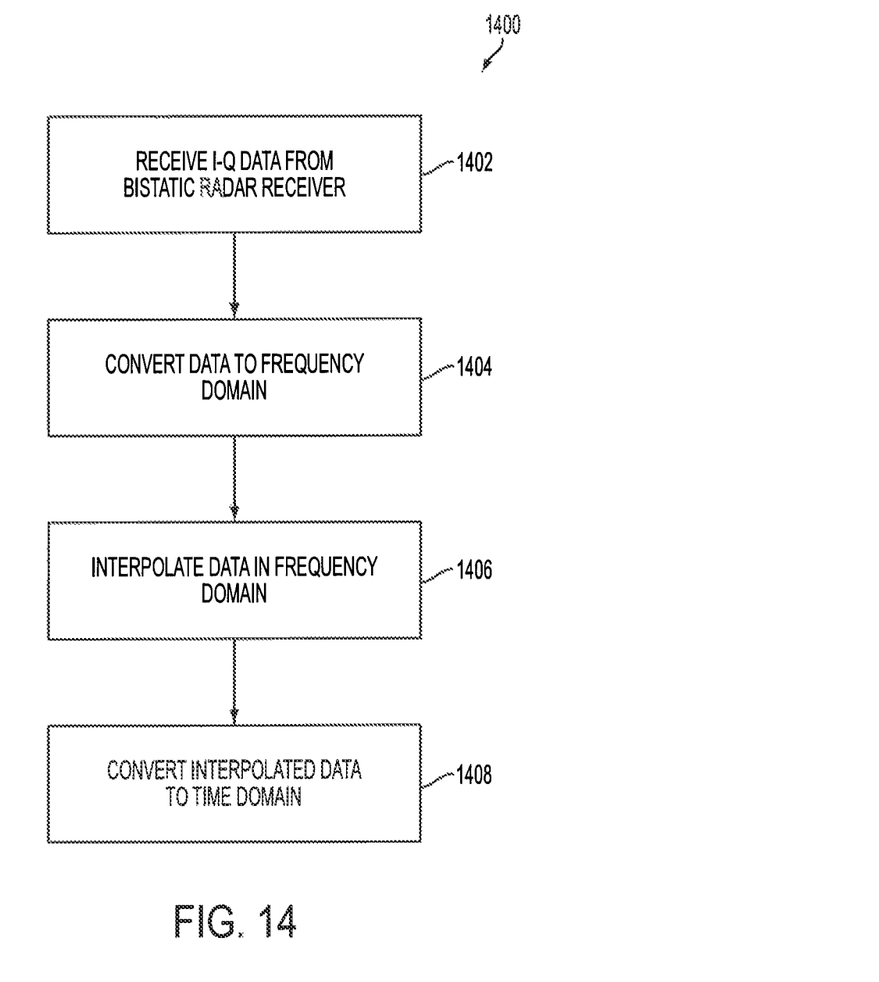
FIG. 14 is a flow diagram of a method, in accordance with one embodiment.

FIG. 14 is a flow diagram of a method, in accordance with one embodiment. For example, FIG. 14 is a flow diagram of a method 1400 for removing gate and range walk from bistatic radar data, in accordance with one embodiment. Method 1400 may be performed using one or more portions of system 810 of FIG. 8 discussed above. It is to be appreciated that the operation may not occur in the order described, nor may the operation require all the steps discussed below.

In step 1402, in-phase quadrature data is received from a radar receiver. For example, I-Q data may be received from a bistatic radar receiver such as bistatic radar receiver 420 of FIG. 4 or bistatic radar receiver 1020 of FIG. 10. Bistatic radar receiver 420 or 1020 may receive transmitted pulses at a first rate controlled by a first local oscillator. The transmitted pulses may be transmitted at a second rate, controlled by a second local oscillator.

In step 1404, the received I-Q data is converted into the frequency domain. For example and without limitation, the received I-Q data may be converted by frequency domain conversion module 812 of system 810 of FIG. 8 using a fast Fourier transform.

In step 1406, the data converted into the frequency domain may be interpolated. For example, the converted data may be interpolated by interpolation module 813 of system 810 of FIG. 8. In some embodiments, interpolation module 813 may use a keystone formatting technique to interpolate the converted data and remove gate walk and range walk from the converted data.

In step 1408, the interpolated data may be converted back to the time domain, for example, by time domain conversion module 814. Converted data may be output to another system in one embodiment. In another embodiment, coherent processing may be applied to converted data to identify a range for targets under observation.

Figure 15:
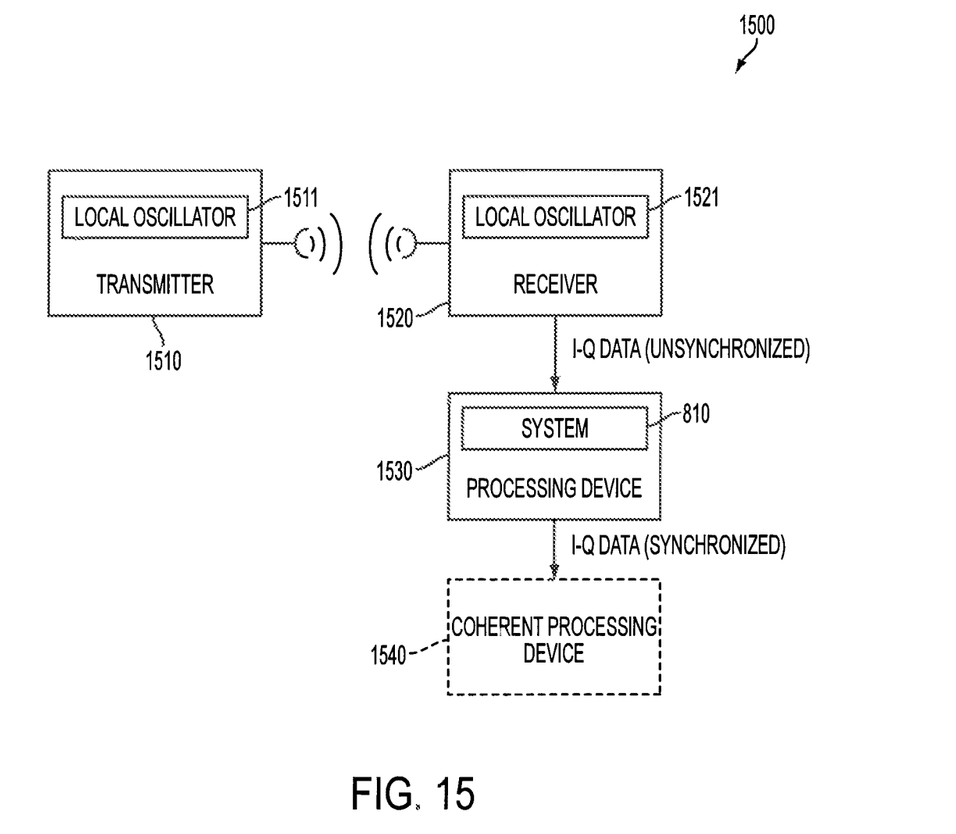
FIG. 15 is a diagram of a system in accordance with an embodiment.

FIG. 15 is a diagram of a system 1500 in accordance with an embodiment. For example, In the example shown, system 1500 includes a bistatic radar transmitter 1510 including a local oscillator 1511, a bistatic radar receiver including a local oscillator 1521, a processing device 1530 implementing system 810 of FIG. 8, and a coherent processing device 1540.

Local oscillator 1511 may be coupled to transmitter 1510 or may be integrated with transmitter 1510.

Bistatic radar receiver 1520 includes local oscillator 1521. As with local oscillator 1511, local oscillator 1521 may be coupled to receiver 1520 or may be integrated with receiver 1520.

Receiver 1520 may provide processing device 1530 with unsynchronized inphase-quadrature (I-Q) data.

In one example, processing device 1530 may implement system 810 of FIG. 8, as described herein, may synchronize the received data and output synchronized I-Q data. Processing device 1530 may output the synchronized I-Q data to, for example and without limitation, a coherent processing device 1540.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system, comprising:
   a transmitter configured to transmit pulses at a first rate, wherein the first rate is controlled by a first local oscillator;
   a receiver configured to receive return pulses at a second rate, wherein the second rate is controlled by a second local oscillator; and
   a processing device configured to synchronize, with respect to the first rate, in-phase quadrature data received from the receiver using a keystone formatting technique, wherein the synchronization comprises converting the received in-phase quadrature data from a time domain to a frequency domain, interpolating the converted data in the frequency domain, and converting the interpolated data into the time domain.

2. The system of claim 1, wherein the first rate is different than the second rate.

3. A method of synchronizing radar data, comprising:
   receiving, by a processor, in-phase quadrature data from a radar receiver, wherein the radar receiver receives pulses at a first rate controlled by a first local oscillator, and wherein the pulses are return pulses based on transmitted pulses transmitted by a transmitter at a second rate controlled by a second local oscillator; and
   synchronizing, by the processor, with respect to the first rate, the received in-phase quadrature data using a keystone formatting technique, wherein the synchronizing comprises converting the received in-phase quadrature data from a time domain to a frequency domain, interpolating the converted data in the frequency domain, and converting the interpolated data into the time domain.

4. The method of claim 3, wherein the first rate is different than the second rate.

5. A computer readable storage medium having instructions stored thereon that, when executed by a processor, cause the processor to perform operations including:
   receiving in-phase quadrature data from a radar receiver, wherein the radar receiver receives pulses at a first rate controlled by a first local oscillator, and wherein the pulses are return pulses based on transmitted pulses transmitted by a transmitter at a second rate controlled by a second local oscillator; and
   synchronizing, with respect to the first rate, the received in-phase quadrature data using a keystone formatting technique, wherein the synchronizing comprises converting the received in-phase quadrature data from a time domain to a frequency domain, interpolating the converted data in the frequency domain, and converting the interpolated data into the time domain.

6. The computer readable storage medium of claim 5, wherein the first rate is different than the second rate.

7. A computer program product comprising a computer-usable medium having control logic recorded thereon for enabling a processor to perform operations to synchronize radar data, the operations comprising:

receiving in-phase quadrature data from a radar receiver, wherein the radar receiver receives pulses at a first rate controlled by a first local oscillator, and wherein the pulses are return pulses based on transmitted pulses transmitted by a transmitter at a second rate controlled by a second local oscillator; and     synchronizing, with respect to the first rate the received in-phase quadrature data using a keystone formatting technique, wherein the synchronizing comprises:

converting the received in-phase quadrature data from a time domain to a frequency domain,         interpolating the converted data in the frequency domain, and         converting the interpolated data into the time domain.

8. The computer program product of claim 7, wherein the first rate is different than the second rate.

\* \* \* \* \*